United States Patent [19]
Bando et al.

[11] Patent Number: 6,040,867
[45] Date of Patent: Mar. 21, 2000

[54] TELEVISION SIGNAL RECEIVING APPARATUS AND METHOD SPECIFICATION

[75] Inventors: Yumi Bando; Takumi Okamura; Toshinori Murata, all of Yokohama, Japan

[73] Assignee: Hitachi, Ltd., Tokyo, Japan

[21] Appl. No.: 08/803,532

[22] Filed: Feb. 20, 1997

[51] Int. Cl.$^7$ ...................................................... H04N 7/18
[52] U.S. Cl. ........................... 348/423; 348/461; 348/473; 348/553; 348/725; 370/60; 370/391; 370/474; 370/537; 455/3; 455/4
[58] Field of Search ..................................... 348/423, 461, 348/462, 465, 466, 467, 473, 476, 553, 725, 726, 728, 714, 731

[56] References Cited

U.S. PATENT DOCUMENTS

| | | | |
|---|---|---|---|
| 5,444,499 | 8/1995 | Saitoh | 348/734 |
| 5,583,562 | 12/1996 | Birch et al. | 348/12 |
| 5,589,892 | 12/1996 | Knee et al. | 348/731 |
| 5,594,492 | 1/1997 | O'Callaghan et al. | 348/10 |
| 5,602,920 | 2/1997 | Bestler et al. | 380/49 |
| 5,650,830 | 7/1997 | Lee | 348/731 |
| 5,671,226 | 9/1997 | Murakami et al. | 348/423 |
| 5,708,961 | 1/1998 | Hylton et al. | 348/7 |

FOREIGN PATENT DOCUMENTS

| | | |
|---|---|---|
| 62-252286 | 11/1987 | Japan . |
| 6276499 | 9/1994 | Japan . |
| 7284035 | 10/1995 | Japan . |
| 7312745 | 11/1995 | Japan . |

OTHER PUBLICATIONS

European Telecommunications Standards Institute ETSI Secretariat, pp. 3–62; Reference No. DE/JTC–DVB–5.

*Primary Examiner*—Anand S. Rao
*Assistant Examiner*—Shawn S. An
*Attorney, Agent, or Firm*—Antonelli, Terry, Stout & Kraus, LLP

[57] ABSTRACT

A television signal receiving apparatus and method is provided having channel decode means for receiving a signal with a video signal, a sound signal, a data signal, and additional data multiplexed to perform tuning, demodulation, and error correction on the received signal and a demultiplexor for separating the multiplexed signal to output coded data of each of the video signal, the sound signal, and the data signal and for extracting service information as one of additional data. A storage device is provided for storing the service information extracted from the demultiplexor, together with a write controller for controlling writing into the storage device, and a read controller for controlling reading of the storage device according to a user command entered by a user. A source decoder is also provided for decoding the coded data outputted from the demultiplexor using the information outputted from said storage device to output the video signal, the sound signal, and the data signal. The storage device records the service information supplied from the demultiplexor, and the read controller performs control such that necessary data are read from the storage device as required by the user, thereby enhancing the speed of processing associated with the service information to provide a quick response to the user requirement. Also, the write controller can control storage such that only necessary information for the next processing operation is stored, thereby reducing the size of the storage device which is necessary.

7 Claims, 7 Drawing Sheets

PACKET STRUCTURE

PACKET MULTIPLEXING

TELEVISION SIGNAL RECEIVING APPARATUS AND METHOD SPECIFICATION

BACKGROUND OF THE INVENTION

The present invention relates to an apparatus for recording/reproducing a television signal, especially, a television signal with a video signal, a sound signal, a data signal, and additional data such as television program information multiplexed thereon. More particularly, the present invention relates to an apparatus for recording all or part of service information, which is one of the additional data in the multiplexed signal, and reading information required by the user from the recorded information, thereby enhancing processing speed and response to an operation required by the user.

Conventionally, for a broadcasting method in which video and data are multiplexed for transmission, a teletext system as disclosed in Japanese Non-examined Patent Publication Hei 4-15676 is known. However, because text information is transmitted on a particular line during a vertical retrace interval, the volume of data carried in such a way is limited, thereby making high-level data broadcasting difficult.

For broadcasting associated with video contents, conversation contents may be transmitted as data, which are decoded on the receiver side to be attached with a text for those who are hard of hearing. For broadcasting not directly associated with video contents, news, weather forecasting, program guide, and stock price information, for example, may be displayed. In any case, these broadcasting systems do not involve such information, which significantly change in its contents in an extremely short time.

Thus, the conventional data broadcasting represented by teletext is limited in the volume of data carried, thereby making it difficult to provide high-level broadcasting. This problem, among others, has brought about the current investigation into the realization of digital broadcasting. In digital broadcasting, a video signal, a sound signal, and service information (to enable automatic configuration of the receiver to demultiplex and decode the various streams of programs within the multiplex) in addition to a data signal are all converted to digital signals, which can be compressed by digital technology to a great extent, resulting in the multiplexing of four to six channels in the bandwidth of a single current channel.

In such digital broadcasting, signals for four to six channels can be multiplexed in the bandwidth of a single current channel as mentioned above, so that a total of several hundred channels can be easily implemented. Further, the digital technologies bring about a variety of new capabilities. For example, these new capabilities include direct selection by searching a displayed program table for a desired program, obtaining home shopping information to order a desired product, participating in a quiz show or a questionnaire asked by a discussion program, and near-on-demand service. In such digital broadcasting services, chances are greater than ever before for viewers to access these services, thereby requiring a quick response by the receiver to user operations. However, as the information transmitted to the receiver increases, the processing time for searching for necessary information and accessing the searched information becomes longer. Therefore, searching and accessing the information transmitted after a request is made by the user impairs quick response to user requests.

It is noted that the terminology used in the present application is in correspondence with the terminology found in the European Telecommunication Standard, entitled "Digital Broadcasting System for Television, sound and data services; specification for Service Information (SI) in Digital Video Broadcasting (DVB) Systems," Draft prETS 300 468, October., 1994, pgs. 1–62, which is hereby incorporated by reference.

SUMMARY OF THE INWENTION

It is an object of the present invention to provide a television signal receiving apparatus and method in which the processing time is reduced.

It is another object of the present invention to provide a television signal receiving apparatus and method in which a storage device is provided to memorize the service information.

It is still another object of the present invention to provide a television signal receiving apparatus and method in which the storage device is controlled by the output signal of the write controller and the read controller.

In carrying out the invention and according to one aspect thereof, there is provided a television signal receiving apparatus comprising: a channel decoder for receiving a signal with a video signal, a sound signal, a data signal, and additional data multiplexed thereon to perform tuning, demodulation, and error correction on the received signal; a demultiplexor for separating the multiplexed signal to output coded data of each of the video signal, the sound signal and the data signal, and for extracting service information as one of the additional data; a storage device for storing the service information extracted in the demultiplexor; a write controller for controlling writing into the storage device; a read controller for controlling reading of the storage device according to a command entered by a user; and a source decoder for decoding the coded data outputted from the demultiplexor to perform processing on the decoded data by using the service information outputted from the storage device in order to output the video signal, the sound signal, and the data signal; wherein the storage device records the service information supplied from the demultiplexor and the read controller performs control such that necessary data are read from the storage device as required by the user, thereby enhancing the speed of processing associated with the service information to provide a quick response to the user requirement.

DESCRIPTION OF THE PREFERRED EMBODIMENTS

This invention will be described in further detail by way of example with reference to the accompanying drawings.

Figure 1:
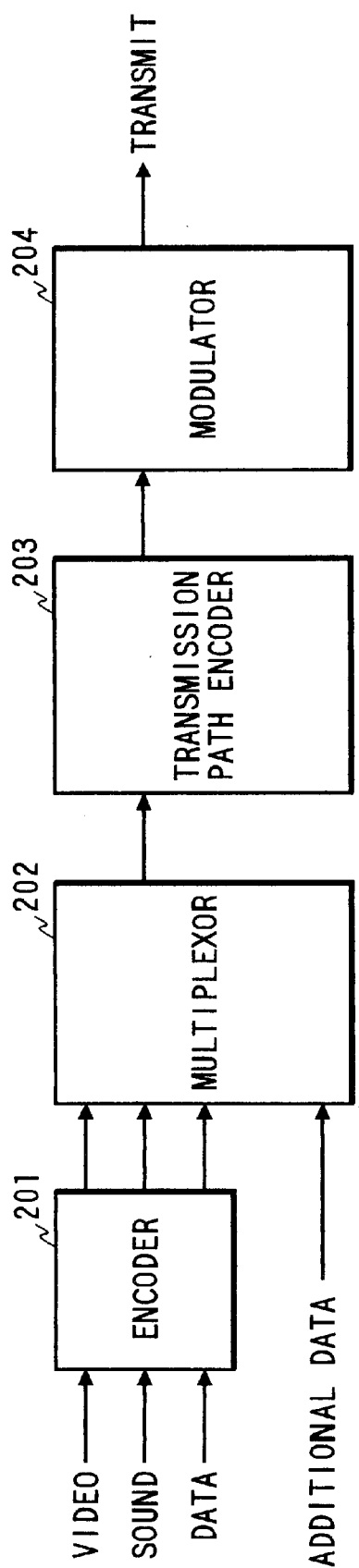
FIG. 1 is a block diagram illustrating the broadcasting side of a send and receive system for digital broadcasting.

Before starting the description of the embodiments, an outline of a digital broadcasting system will be described briefly. FIG. 1 shows processing which can be used for digital broadcasting. In the figure, reference numeral 201 indicates an encoder, reference numeral 202 indicates a multiplexor, reference numeral 203 indicates a transmission path encoder, and reference numeral 204 indicates a modulator.

Figure 2A:
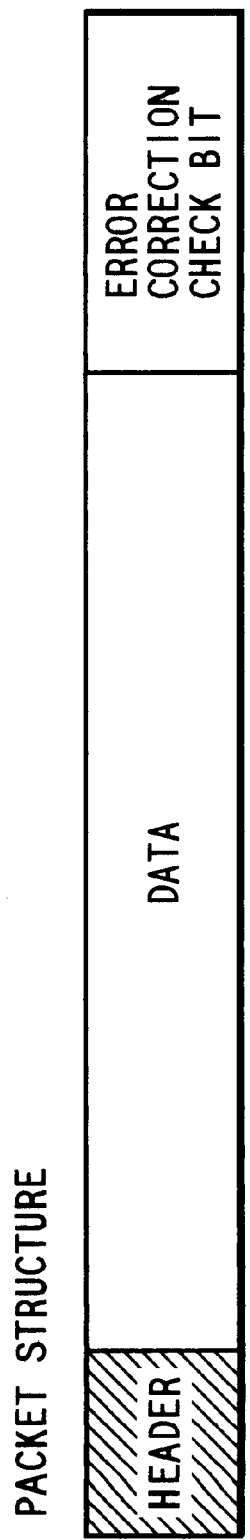
FIGS. 2A and 2B schematically illustrate packet and frame structures.
Figure 2B:
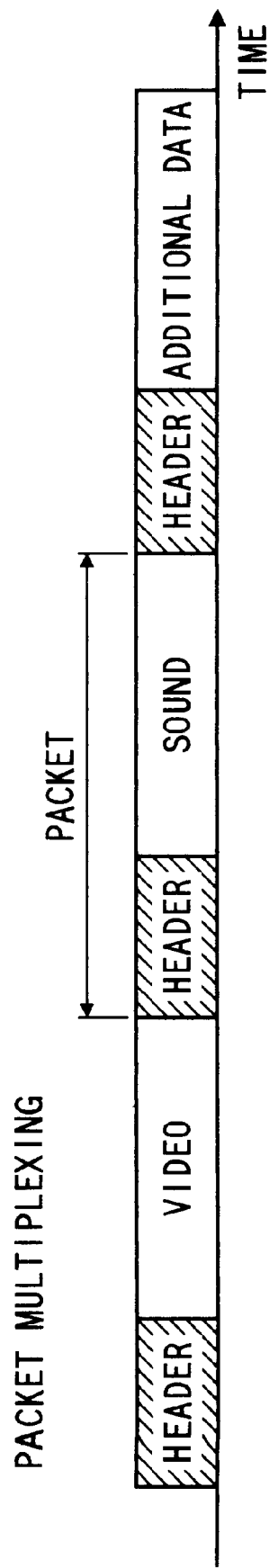

On the broadcasting station side, a video signal, a sound signal, and a data signal are converted to digital signals respectively to be compressed by the encoder 201. The compression is made by DPCM (differential Pulse Code Modulation), DCT (Discrete Cosine Transform) or MPGE2 (Moving Picture Experts Group Phase 2) in accordance with conventional procedures. The compressed data are attached with a header and an error correction bit to be converted to a packet by the multiplexor 202 along with additional data. An example of a structure of this packet is shown in FIG. 2(A). Such a packet is arranged in sequence as shown in FIG. 2(B), for example, a video packet, a sound packet, an additional data packet, and a video packet again, to be multiplexed. The packet may be multiplexed at any location. Each packet is identified by the packet identifier (PID) contained in its header. The video and the sound signals are separated by way of the PID at the receiver side. The multiplex signal thus obtained is coded by using a convolution method such as Viterbi code or by a blocking method such as Reed-Solomon code through the transmission path encoder 203. The coded data are subjected by the modulator 204 to digital modulation such as OFDM or QPSK to be transmitted in the form of broadcast radio waves.

Figure 3:
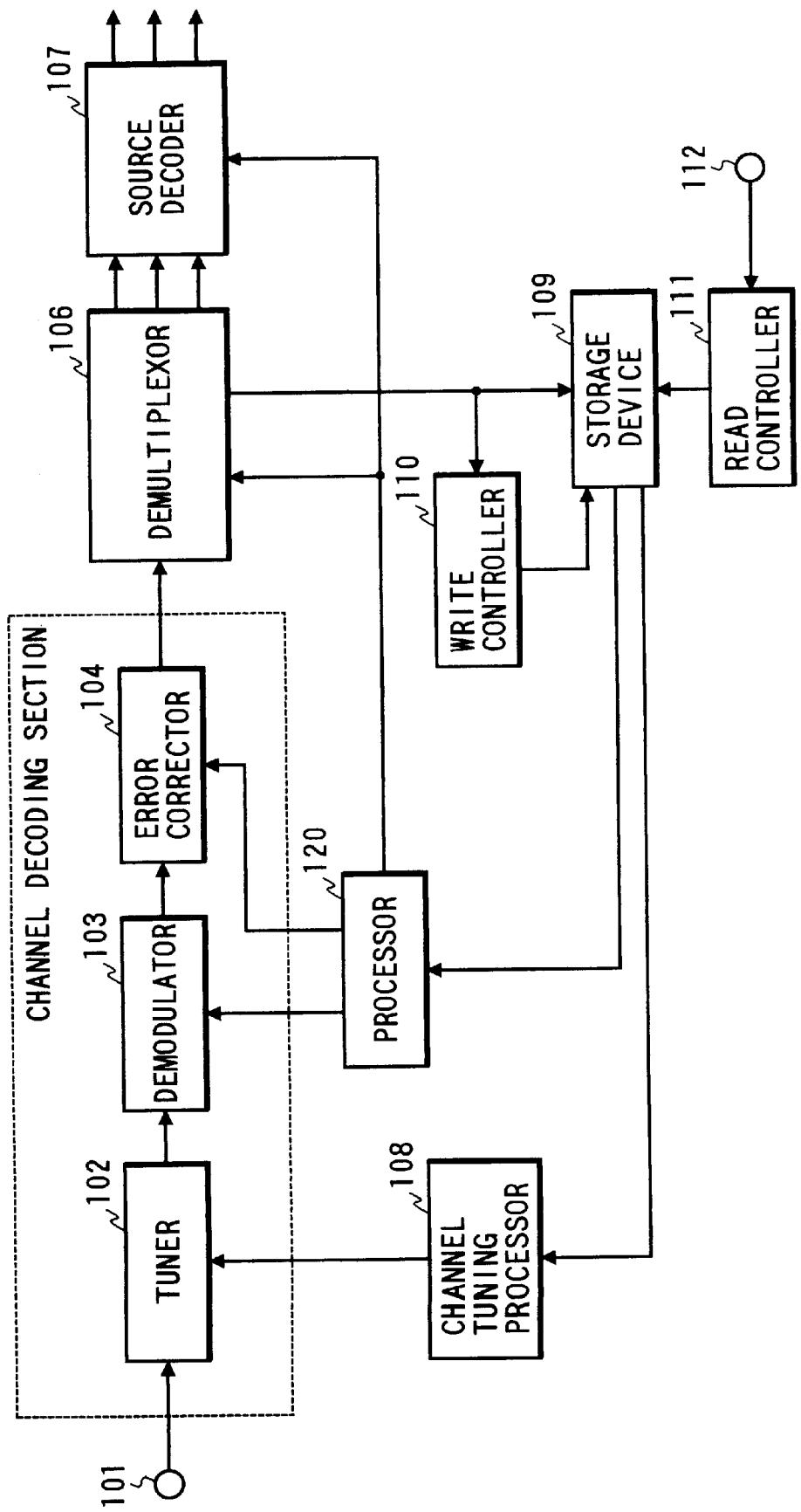
FIG. 3 is a block diagram illustrating a first embodiment of the present invention.

In what follows, the preferred embodiments of the present invention will be described. FIG. 3 shows a first embodiment of the invention. In the figure, reference numeral 101 indicates a signal input terminal, reference numeral, 102 indicates a tuner, reference numeral 103 indicates a demodulator, reference numeral, 104 indicates an error corrector, reference numeral 106 indicates a demultiplexor, reference numeral 107 indicates a source decoder, reference numeral 108 indicates a channel tuning processor, reference numeral 109 indicates a storage device, reference numeral 110 indicates a write controller, reference numeral 111 indicates a read controller, and reference numeral 112 indicates a user command input terminal.

From the signal input terminal 101, a digital broadcast signal is entered, tuned and detected by the tuner 102 to provide digital information, which is outputted to the demodulator 103. The demodulator 103 demodulates the digitally modulated signal and outputs the resultant signal to the error corrector 104. The error correction 104 performs, on the demodulated signal, the correction of any error caused by noise generated, for example, along the transmission path, and outputs the resultant signal to the demultiplexor 106. The demultiplexor 106 separates the multiplexed signal formed by multiplexing the video signal, the sound signal and the like on the sending side and sends the resultant separated signals to the source decoder 107. At the same time, the demultiplexor 106 extracts the service information as one of the additional data, and supplies the extracted service information to the storage device 109 and the write controller 110. The source decoder 107 decodes the coded data outputted from the demultiplexor 106 to output the video signal, the sound signal, and the data signal.

The service information (SI) includes digital data describing the delivery system, content, and scheduling and timing of broadcasting data streams, etc. The channel selected by the viewer is reproduced by extracting the information concerning the selected channel from the multiplexed signal by using the SI. The SI further includes the information for displaying a program map and a program guide, etc. The information is used to display the program map or program guide in accordance with a command from the viewer. If the SI is constructed in packet form as shown in FIG. 2(A) and 2(B) each service information is identified by specific data included in the header of the SI. The writing to the storage device 109 and the reading from the storage device 109 are controlled by the specific data.

The storage device 109 stores all service information outputted from the demultiplexor 106 based on the control signal coming from the write controller 110. If information to be stored has the same unique number as that of information already stored, namely, if the service information has been updated on the sending side, the contents of the storage device 109 are updated. The read controller 111 outputs a control signal such that necessary information is read from the storage device 109 according to a user command entered from the user command input terminal 112. The storage device 109 outputs the specified information to an appropriate device through the channel tuning processor 108 or the processor 120 according to the control signal coming from the read controller 111. For example, for channel tuning, physical channel information is read from the service information stored beforehand in the storage device 109 and the read physical channel information is set to the channel tuning processor 108. The channel tuning processor 108 sets a specified channel frequency to the tuner 102. In the example of FIG. 3, the channel tuning was taken up for example. It will be apparent that the information read from the storage device 109 can be outputted to any device through the processor 120. For example, this stored information can be provided through the processor 120 to the demodulator 103 for setting the demodulating, or the error corrector 104 for setting the error correcting, or the demultiplexor 106 for controlling demultiplexing or the source decoder 107 to control its processing.

Thus, the information necessary for the processing is stored in advance rather than searching the transmitted information for the necessary information every time the same becomes necessary. This novel constitution enhances the processing speed and, at the same time, the response to user operations.

Figure 4:
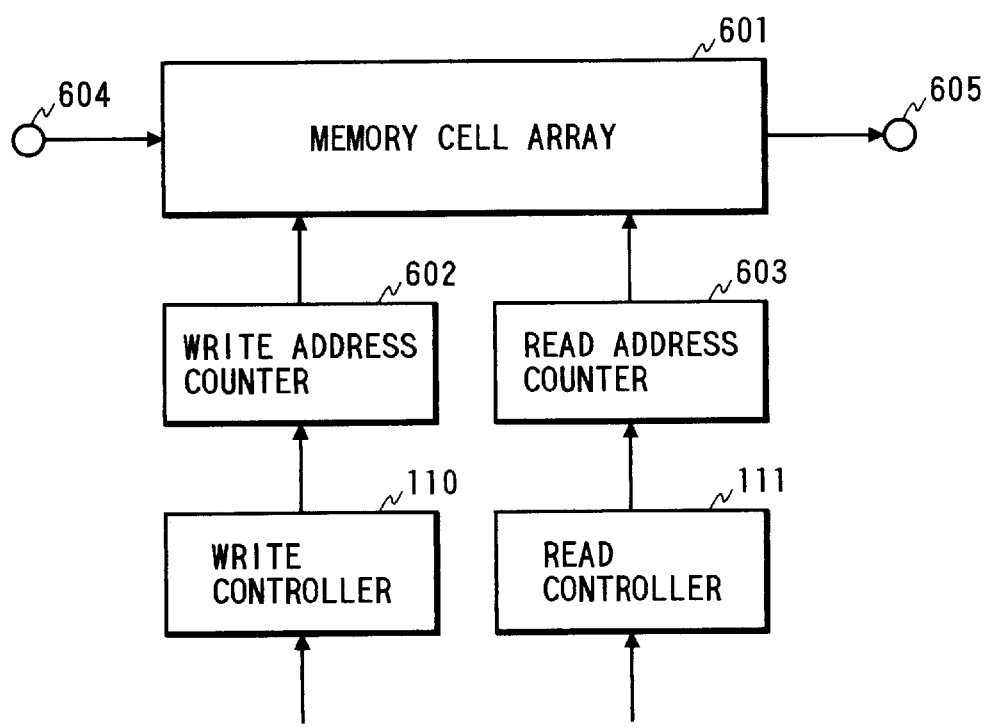
FIG. 4 is a block diagram illustrating an embodiment of the storage device.

Now, referring to FIG. 4, an example of the constitution of the storage device 109 is shown. In the first embodiment, the storage device is described by using a semiconductor memory device for example. In the figure, reference numeral 601 indicates a memory cell array, reference numeral 602 indicates a write address counter, reference numeral 603 indicates a read address counter, reference numeral 604 indicates a record signal input terminal, and reference numeral 605 indicates a read signal output terminal. It should be noted that components similar to those described above are assigned with similar reference numerals.

When a record signal is entered in the record signal input terminal 604, the write controller 110 operates to issue a command to the write address counter 602 to record in the memory cell array 601 at a specified address. Meanwhile, when a command is given from the viewer, the read controller 111 operates to perform control such that, when the read address counter 603 selects a specified address in the memory cell array 601, the desired data are read. The signal thus read is outputted to the read signal output terminal 605.

As described in the above-mentioned example of the semiconductor memory device, the storage device 109 provides recording and reproducing capabilities at the same time because there exists a signal recording system and a system reproducing system independently.

Figure 5:
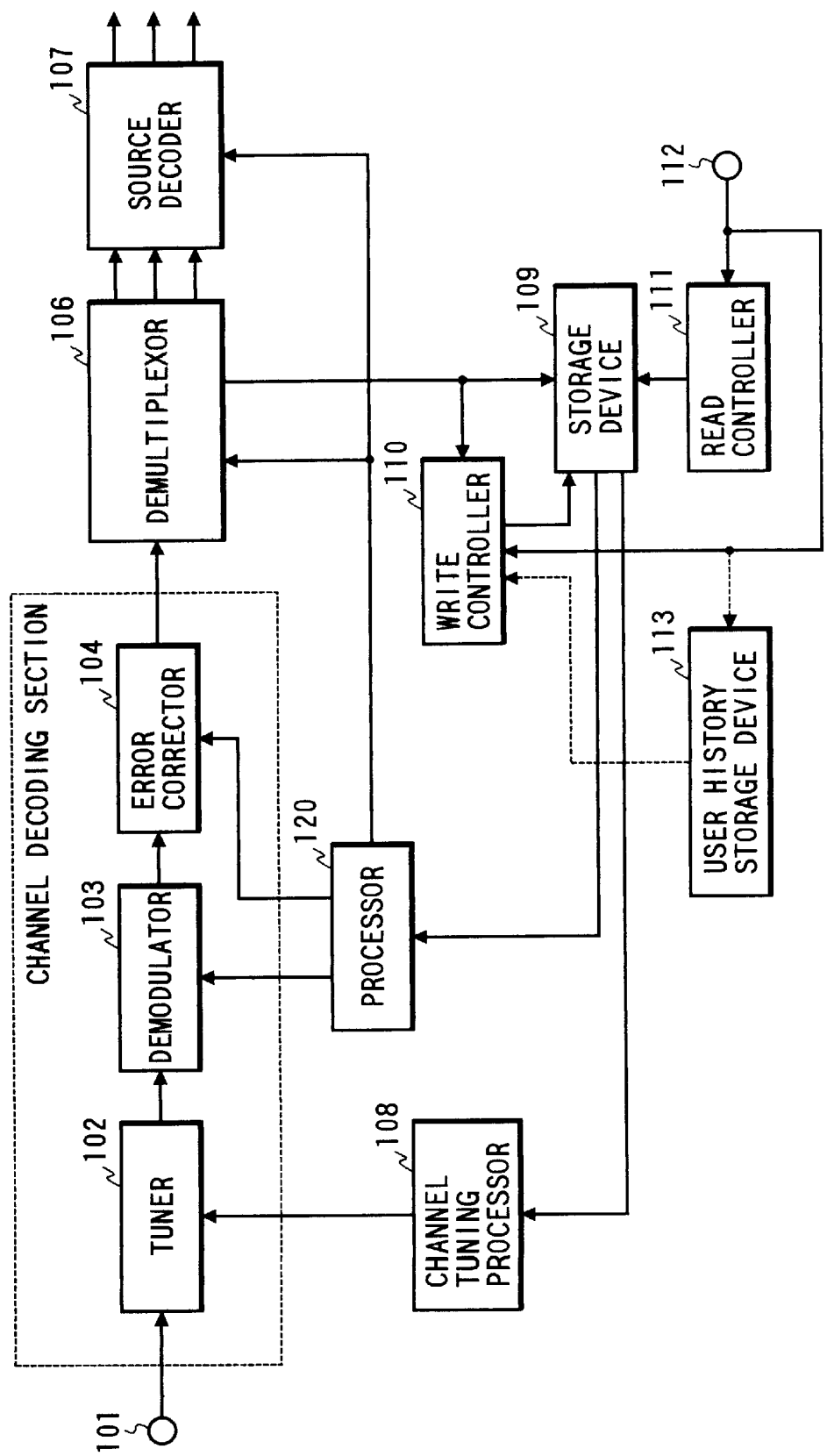
FIG. 5 is a block diagram illustrating a second embodiment of the present invention.

Referring to FIG. 5, there is shown the television signal receiving apparatus practiced as a second preferred embodiment of the present invention. In the figure, all components with the previously used numerals are the same as those described above. Therefore, the second embodiment basically operates in the same manner as the first embodiment of FIG. 1 except for the operation of the write controller 110. To be more specific, the write controller 110 operates in response to information entered from the user command input terminal 112 to provide processing to be performed in the next step, thereby selecting necessary information from the service information outputted from the demultiplexor 106 and writing only the necessary information to the storage device 109. This permits reduction of the necessary size of the storage device 109. FIG. 5 also shows a user history storage device 113 which will be discussed later.

Figure 6:
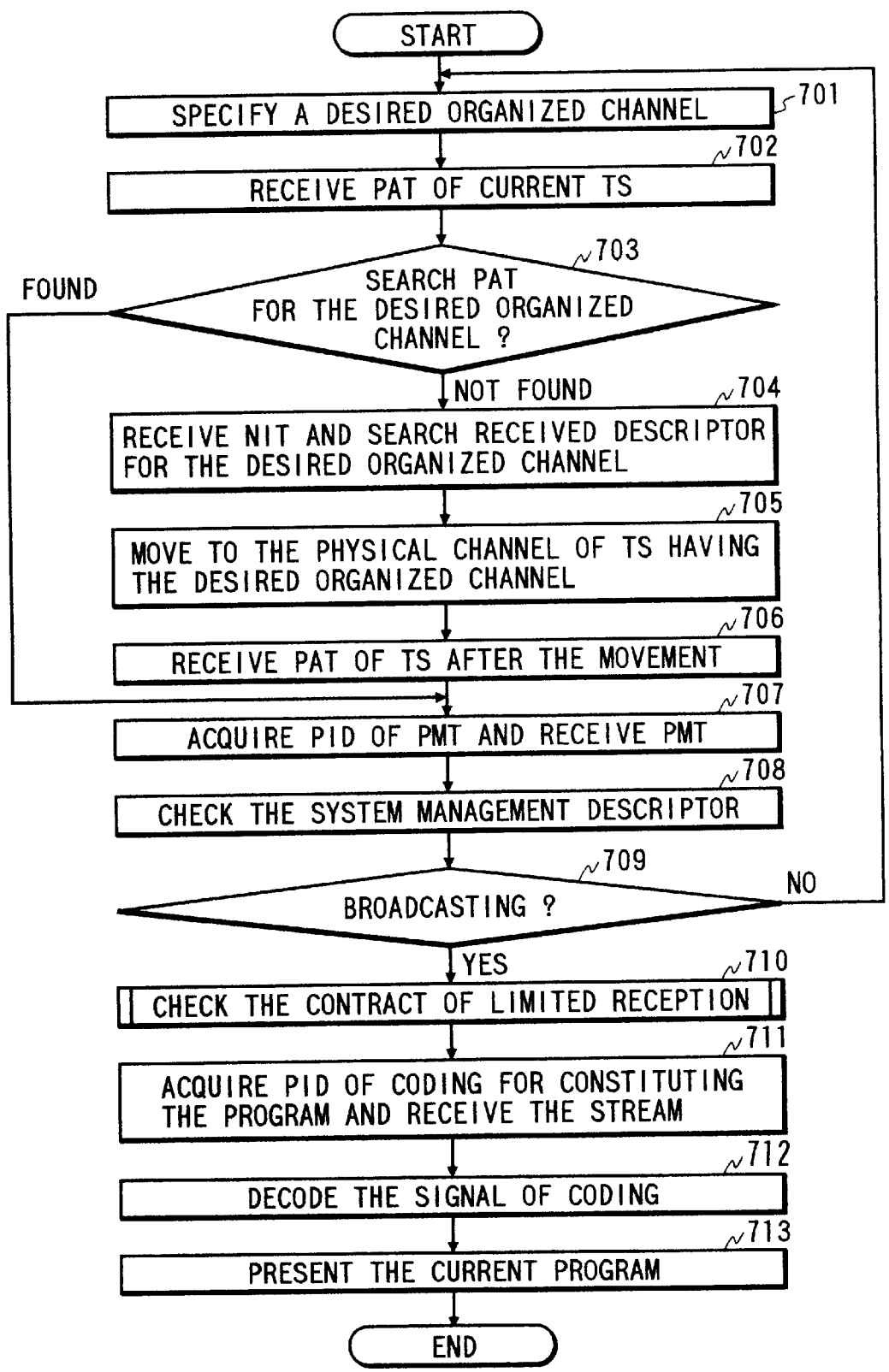
FIG. 6 is a flowchart indicating the processing for viewing a desired program.

FIG. 6 shows a general example of the processing for viewing a selected program using the embodiment of FIG. 5. The steps shown in FIG. 6 are carried out by the write controller 110, the read controller 111 and the channel tuning processor 108 to control write-in and read-out from the storage device 109 to control the tuner 102 for channel selection. Similar processing can be carried out using the processor 120 to control other elements in FIG. 5. First, in step 701, a desired organized channel is specified by the user at terminal 112. The organized channel herein denotes a conventional television channel. Then in step 702, a PAT (Program Association Table) of the current transport stream (hereinafter abbreviated as TS) is received in the storage device 109. The PAT is one of the tables in PSI (Program Specific Information) specified in the international standard MPEG-2 Systems. In step 703, the PAT received in step 702 is searched for the desired organized channel in the channel tuning processor 108. If the desired organized channel is found, the process goes to step 707; if the desired organized channel is not found, the process goes to 704. In step 704, a NIT (Network Information Table), one of the PSI, is received to search for the desired channel from a NIT descriptor, thereby acquiring a physical channel (a frequency channel) containing the desired channel. The NIT provides network information in which the radio frequencies, the modulation formats, and error correction formats, etc. are described.

In step 705, the processing moves to the physical channel acquired in step 704. The movement to the physical channel is realized by setting the frequency of the physical channel to the tuner 102 (refer to FIG. 5). Thus, the channel tuning is performed by the processing of steps 701 and 705. Then, in step 706, a PAT of the TS after the movement is received.

In step 707, a PID (Packet ID) of a PMT (Program Map Table) is acquired from the received PAT to receive the PMT which is designated by the acquired PID. The PMT is one of the tables of the PSI and describes the stream of the program and its PID. Then, in step 708, from the description of a system management descriptor in the PMT, it is checked to see if the desired organized channel is for broadcasting or non-broadcasting in step 709. If the desired organized channel is for non-broadcasting, the process goes back to step 701 to specify another desired organized channel, repeating the processing. If the desired organized channel is for broadcasting, the process goes to the next step; namely, in step 710, such processing associated with the limited reception contract as descrambling is performed. After the limited reception is cleared, the PID of the coding for constituting a program of the desired organized channel is acquired from the PMT in step 711. The acquired PID is set to the demultiplexor 106 to receive the stream. In step 712, the coded signal outputted from the demultiplexor 106 is set to the source decoder 912 for decoding (refer to FIG. 5). Then, in step 713, the current program of the desired organized channel is presented. Thus, the general processing for viewing a program has been described. In the above-mentioned example, the processing for viewing a program requires the PSI information such as the organized channel data in the PAT and the PID of the PMT, the organized channel data in the NIT and the physical channel data, and the system management description in the PMT and the PID of the coding for constituting a program.

First, the PAT are received and necessary information in the PAT is memorized in the storage device 109. Further, the information which is included in the PMT and NIT, and which is needed in the later processing begins to be memorized. The MPT and the NIT are searched and acquired information is memorized in the storage device 109 while the PAT is received in step 702 and is being processed in step 703. The acquisition of the desired information from the transmitted information in the order of transmission is faster than to acquire it by setting the order of acquisition, because the order of transmitted data is optional. In the step 704, if the information in the NIT is needed, it can be acquired by reading the information recorded in the storage device 109. As mentioned above, the processing shown for the flow of FIG. 6 is carried out according to the user command, and at the same time, the necessary information required to reproduce the program is written to the storage device 109. Therefore, the necessary information is easily acquired by reading information recorded in the storage device 109. This processing operation is faster than a process in which the necessary information is retrieved from transmitted information. In addition, only a relatively small memory capacity is required for the storage device 109 because only necessary information is memorized in the storage device 109. All the information required for reproduction of the program, as shown in the above example, is acquired and is memorized in the storage device 109.

The following is another proposal in which only the information whose transmission period is relatively long is memorized in the storage device. For example, network information having a relatively long period for repeated transmission like the NIT requires time to acquire it from the transmission signal, so that it is better to acquire and to memorize it in advance. The information having a short period for repeated transmission like the PAT and the PMT is acquired from the transmission signal at the time of necessity in each processing. Thus, the amount of information necessary for memorizing in the storage device 109 can be reduced, and a necessary memory capacity of the storage device 109 can be made even smaller.

Yet another proposal is to memorize the information that is first needed for channel selection processing like the PAT and the PMT in the storage device 109 so as to be able to start channel selection processing at once, and the other service information is acquired while processing the information in the PAT and the PMT.

In each case, when the transmitted information is renewed, the information that is memorized in the storage device 109 is renewed.

In accordance with another feature, channel information, as well as the service information that has been selected by the user in the past, can be memorized in the storage device 109 as user history information to be able to correspond to the user command extremely quickly. For example, the service information concerning a channel which is memorized in the user history is acquired at the time of power on, so that the event of the selected channel can be presented quickly. It is effective to use the memorized user history information for the user who frequently selects a predetermined channel. The user history information can be memorized in the storage device 109, or in a separate user history memory 113 shown in FIG. 5.

The following is an example of processing for displaying a program map. As for the program map information, much information quantity is transmitted because it includes one week or more of program tables. A considerably large memory capacity is required to memorize all of the program map information. In case the acquisition of the program map information from a transmitted signal and the processing of the acquired information are made after receiving the user command, a prompt display of the program map is not attained. To solve this problem, a part of the program map information is memorized in the memory beforehand without the user command, so that the program map can be displayed quickly by reading the information in the memory according to a request from the viewer. The program map information to be memorized beforehand in the storage device 109 is, for example, the first one screen or the first several screens after current time. When the user command for displaying the program map is received, the memorized program map is displayed. A program map for the next screen is acquired from the transmission signal and memorized in the storage device 109 to prepare a further program map so as to be able to display the map quickly corresponding to the user's request. Processing for displaying the program map using memorized information and processing for acquiring the future program map from the transmission signal and memorizing the acquired information can be performed simultaneously. In case the transmitted signal is renewed, the information memorized in the storage device 109 is also renewed. Using this technique of processing, a program map is displayed extremely quickly without using a storage device of large memory capacity.

Thus, the present invention enhances the speed of not only channel tuning processing and program table presentation processing but also the processing that uses service information and provides quick presentation of desired contents.

Figure 7:
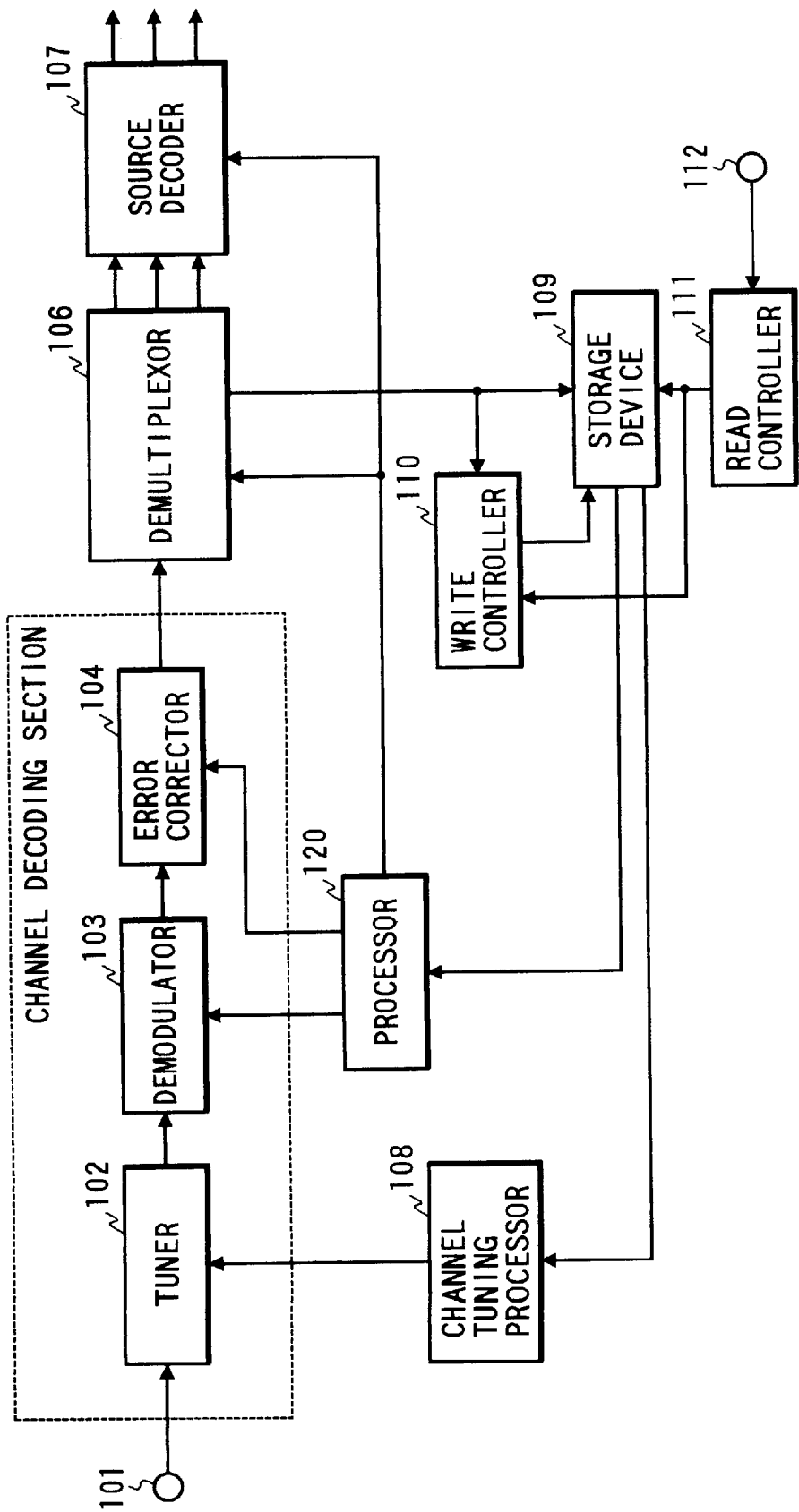
FIG. 7 is a block diagram illustrating the third embodiment of the present invention.

FIG. 7 shows the television signal receiving apparatus practiced as a third preferred embodiment of the invention. In the figure, all components are similar to those described above. The operations of this embodiment are generally the same as those of the second embodiment except that the write controller 110 predicts a next operation based on an output signal of the read controller 111 to control the writing to the storage device 109.

The control of the writing shown in FIG. 5 is done based on the user command, while, in case of FIG. 7, the reading of the storage device 109 is controlled based on the user command, and write controller 110 is controlled by the user command to write the information needed for successive process to the storage device 109. For example, in case a program map is displayed according to the command from the user, the write controller 110 is controlled by the output of the read controller 112 to write the next program map to the storage device 109. Thus, the writing is controlled corresponding to the output of the write controller 110.

The above description has been made with regard to digital broadcast signals. It will be apparent however that, for an analog signal such as transmitted by current terrestrial broadcasting systems, these data may only be recorded as service information. Consequently, the present invention is also applicable to analog signal systems with generally the same advantages as those obtained for the above-mentioned digital signal systems.

As mentioned above and according to the invention, service information, which is one of additional data transmitted along with video, sound, and data signals, is extracted, and all or part of the extracted service information is automatically recorded or recorded after update in the storage device. This novel constitution increases the processing speeds of user requirements such as channel tuning, program table presentation, and program contents display, for example, and enhances the response to user operation.

Although the present invention has been described herein in conjunction with the preferred embodiments, it is to be understood that modifications and variations may be utilized without departing from the principles and scope of the invention, as those skilled in the art will readily understand. Accordingly, such modifications and variations may be practiced within the scope of the following claims.

We claim:

1. A television signal receiving apparatus, comprising:
    a channel decoder which receives a television signal containing a video signal, a sound signal, a data signal, and additional data multiplexed therein for tuning, demodulation, and error correction to produce a channel decoded signal;
    a demultiplexor which separates the video signal, the sound signal, the data signal and additional data multiplexed from the channel decoded signal to produce coded data of each of the video signal, the sound signal, and the data signal and to extract service information as one of the additional data;
    a storage device which stores the service information extracted from said demultiplexor;
    a write controller which controls writing of the service information into said storage device in accordance with a user command input by a user;
    a read controller which controls reading of the service information from said storage device in accordance with the user command input by a user;
    a source decoder which decodes the coded data outputted from said demultiplexor by using the service information outputted from said storage device to produce the video signal, the sound signal, and the data signal; and
    wherein said storage device is controlled by said write controller to memorize at least service information having a transmitting period greater than a predetermined time and having a quantity of information greater than a predetermined amount, and is controlled by said read controller to output necessary memorized information as required by the user to thereby enhance the processing speed of the service information for a quick response to the user command.

2. A television signal receiving apparatus according to claim 1, wherein said write controller performs control such that at least part of the service information outputted from said demultiplexor is stored in said storage device and, if the service information is updated, the information stored in said storage device is updated.

3. A television signal receiving apparatus according to claim 1, wherein said write controller performs control such that necessary service information to be performed during the next processing operation based on user operational information is selected from said demultiplexor to record or update the selected information in said storage device during a time period when the television signal is processed using the service information memorized in said storage device.

4. The television signal receiving apparatus according to claim 1, wherein said write controller generates a control signal for writing the service information into said storage device such that the service information needed for the next processing operation is memorized in said storage device.

5. A television signal receiving method of a communication system comprising a channel decoder for decoding a television signal containing a video signal, a sound signal, a data signal, and additional data multiplexed therein, a demultiplexor for demultiplexing the television signal to produce coded data of each of the video signal, the sound signal, and the data signal and to extract service information as one of additional data, a storage device for storing the service information, a write controller and a read controller for controlling writing and reading of said storage device in accordance with a user's request, said television signal receiving method comprising:

storing the service information supplied from said demultiplexor in said storage device;

controlling said read controller to read necessary data from said storage device in accordance with the user's request; and controlling said storage device by a control signal from said write controller to memorize at least information having a transmitting period greater than a predetermined amount and having a quantity of information greater than a predetermined amount, and to output memorized information by a control signal from said read controller.

6. A television signal receiving method according to claim 5 further comprising a step of controlling said write controller such that necessary service information to be performed during the next processing operation based on user operational information is selected from said demultiplexor to record or update the selected information in said storage device when the television signal is processed using the service information memorized in said storage device.

7. A television signal receiving method according to claim 5 further comprising a step of controlling said write controller to generate a control signal such that necessary information needed for the next processing operation is memorized in said storage device based on a control signal from said read controller.

* * * * *